United States Patent
Horiuchi et al.

(10) Patent No.: US 8,361,671 B2
(45) Date of Patent: Jan. 29, 2013

(54) SOLID ELECTROLYTE FUEL-CELL DEVICE

(75) Inventors: Michio Horiuchi, Nagano (JP);
Shigeaki Suganuma, Nagano (JP); Misa Watanabe, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 437 days.

(21) Appl. No.: 10/921,313

(22) Filed: Aug. 19, 2004

(65) Prior Publication Data

US 2005/0042491 A1    Feb. 24, 2005

(30) Foreign Application Priority Data

Aug. 22, 2003 (JP) ................................. 2003-208426

(51) Int. Cl.
*H01M 8/10* (2006.01)

(52) U.S. Cl. ........ 429/465; 429/466; 429/479; 429/481; 429/485

(58) Field of Classification Search .............. 429/30, 429/465, 466, 479, 481, 485
See application file for complete search history.

(56) References Cited

U.S. PATENT DOCUMENTS

| | | | |
|---|---|---|---|
| 6,007,932 A | 12/1999 | Steyn | |
| 6,492,050 B1 * | 12/2002 | Sammes | 429/31 |
| 6,682,842 B1 * | 1/2004 | DeJonghe et al. | 429/33 |
| 6,852,436 B2 * | 2/2005 | Badding et al. | 429/32 |
| 2002/0102450 A1 | 8/2002 | Badding et al. | |
| 2003/0054222 A1 | 3/2003 | Horiuchi et al. | |
| 2004/0043272 A1 * | 3/2004 | Gorte et al. | 429/33 |

FOREIGN PATENT DOCUMENTS

| | | |
|---|---|---|
| CA | 2 387 232 | 11/2002 |
| CA | 2 467 772 | 10/2003 |
| GB | 2286482 | 8/1995 |
| JP | 6-196176 | 7/1994 |
| JP | 06-196176 | * 7/1994 |
| JP | 06196176 | 7/1994 |
| JP | 8-130023 | 5/1996 |
| JP | 2000-243412 | 9/2000 |
| JP | 2001273914 | 10/2001 |
| JP | 2003-92124 | 3/2003 |

(Continued)

OTHER PUBLICATIONS

European Search Report issued Nov. 14, 2005 for European Application No. 04254973.3.

(Continued)

*Primary Examiner* — Patrick Ryan
*Assistant Examiner* — Ben Lewis
(74) *Attorney, Agent, or Firm* — Staas & Halsey LLP

(57) ABSTRACT

The present invention relates to a solid electrolyte fuel-cell device wherein a plurality of fuel cells are formed on a single plate. A plurality of cathode layers are formed on one surface of the flat plate-like solid electrolyte substrate, and a plurality of anode layers on the opposite surface thereof, and each fuel cell is formed from a pair of the cathode layer and the anode layer. An electromotive force extracting lead wire is attached to the cathode layer, and a lead wire is attached to the anode layer. The plurality of fuel cells are connected in series by electrically connecting the cathode layer of one fuel cell to the anode layer of an adjacent fuel cell. Flames formed by combustion of a fuel such as a methane gas are supplied to the entire surface of each anode layer, and air is supplied to each cathode layer.

2 Claims, 6 Drawing Sheets

FOREIGN PATENT DOCUMENTS

| | | |
|---|---|---|
| JP | 2003/197225 | 7/2003 |
| WO | WO 01/89017 | 11/2001 |

OTHER PUBLICATIONS

Japanese Patent Office Action, issued Oct. 7, 2008 correesponding to Japanese Patent Application No. 2003-208426 filed on Sep. 30, 2008.

Canadian Office Action mailed Sep. 30, 2010 in corresponding Canadian application No. 2,478,005.

Canadian Office Action mailed May 11, 2011 in corresponding Application No. 2,478,005.

* cited by examiner

SOLID ELECTROLYTE FUEL-CELL DEVICE

CROSS-REFERENCE TO RELATED APPLICATION

This application claims the priority of Japanese Patent Application Number 2003-208426, filed on Aug. 22, 2003.

BACKGROUND OF THE INVENTION

1. Field of the Invention

The present invention relates to a solid electrolyte fuel-cell device and, more particularly, to a solid electrolyte fuel-cell device comprising a plurality of cathode layers and anode layers formed on a solid electrolyte substrate, wherein a simple structure that does not require hermetic sealing is employed to achieve a compact and thin construction while, at the same time, achieving increased output.

2. Description of the Related Art

Heretofore, fuel cells have been developed and commercially implemented as a low-pollution power generating means to replace traditional power generation such as thermal power generation, or as an electric energy source for electric vehicles that replaces the internal combustion engine which uses gasoline or the like as the fuel. For such fuel cells, much research effort has been expended to increase the efficiency and to reduce the cost.

Fuel cells can be classified into various types according to the method of power generation, one being the type of fuel cell that uses a solid electrolyte. As one example of the fuel cell that uses a solid electrolyte, a fuel cell is known that uses a calcined structure made of yttria($Y_2O_3$)-doped stabilized zirconia as an oxygen ion conducting solid electrolyte layer. This type of fuel cell comprises a cathode layer formed on one surface of the solid electrolyte layer and an anode layer on the opposite surface thereof, and oxygen or an oxygen-containing gas is fed to the cathode layer, while a fuel gas such as methane is fed to the anode layer.

In this fuel cell, the oxygen ($O_2$) fed to the cathode layer is converted into oxygen ions ($O^{2-}$) at the boundary between the cathode layer and the solid electrolyte layer, and the oxygen ions are conducted through the solid electrolyte layer into the anode layer where the ions react with the fuel gas, for example, a methane gas ($CH_4$), fed to the anode layer, the end products of the reaction being water ($H_2O$) and carbon dioxide ($CO_2$). In this reaction process, as the oxygen ions release electrons, a potential difference occurs between the cathode layer and the anode layer. Here, when the cathode layer and the anode layer are electrically connected by a lead wire, the electrons in the anode layer flow into the cathode layer via the lead wire, and the fuel cell thus generates electricity. The operating temperature of this type of fuel cell is about 1000° C.

However, this type of fuel cell requires the provision of separate chambers, one being an oxygen or oxygen-containing gas supply chamber on the cathode layer side and the other a fuel gas supply chamber on the anode layer side; furthermore, as the fuel cell is exposed to oxidizing and reducing atmospheres at high temperatures, it has been difficult to increase the durability of the fuel cell.

On the other hand, there has been developed a fuel cell of the type that comprises a cathode layer and an anode layer formed on opposite surfaces of a solid electrolyte layer, and that generates an electromotive force between the cathode layer and the anode layer by placing the fuel cell in a mixed fuel gas consisting of a fuel gas, for example, a methane gas, and an oxygen gas. The principle of generating an electromotive force between the cathode layer and the anode layer is the same for this type of fuel cell as for the above-described separate-chamber type fuel cell but as, the whole fuel cell can be exposed to substantially the same atmosphere, the fuel cell can be constructed as a single-chamber type cell to which the mixed fuel gas is supplied, and this serves to increase the durability of the fuel cell.

However, in this single-chamber fuel cell also, because the fuel cell has to be operated at a high temperature of about 1000° C., there is the danger that the mixed fuel gas may explode. Here, if the oxygen concentration is reduced to a level lower than the ignitability limit to avoid such danger, there occurs the problem that carbonization of the fuel, such as methane, progresses and the cell performance degrades. In view of this, there is proposed, for example, in Japanese Unexamined Patent Publication No. 2003-92124, a single-chamber fuel-cell device that can use a mixed fuel gas whose oxygen concentration is adjusted so as to be able to prevent the progress of carbonization of the fuel, while at the same time, preventing an explosion of the mixed fuel gas.

The above proposed fuel-cell device is of the type that is constructed by housing individual fuel cells in a single chamber; on the other hand, Japanese Unexamined Patent Publication No. 6-196176, for example, proposes an apparatus that does not house a fuel cell in such a chamber, and that generates electricity by placing a solid electrolyte fuel cell in or near a flame and thereby holding the solid electrolyte fuel cell at its operating temperature.

The earlier described single-chamber fuel-cell device obviates the necessity of strictly separating the fuel and the air, as was the case with conventional solid electrolyte fuel-cell devices, but has to employ a hermetically sealed construction. Further, to increase the electromotive force, a plurality of plate-like solid electrolyte fuel cells are stacked one on top of another and connected together using an interconnect material having high heat resistance and high electrical conductivity so as to be able to operate at high temperatures. As a result, the single-chamber fuel-cell device constructed from a stack of plate-like solid electrolyte fuel cells has the problem that the construction is not only large but also costly. Furthermore, as the temperature is gradually raised to the high operating temperature in order to prevent cracking of the plate-like solid electrolyte fuel cells, this type of single-chamber fuel-cell device requires a significant startup time, thus causing extra trouble to operate.

By contrast, the electricity generating apparatus described above employs the solid electrolyte fuel cell of the type that directly utilizes a flame; this type of fuel cell has the characteristic of being an open type, the solid electrolyte fuel cell not needing to be housed in a hermetically sealed container. As a result, this type of fuel cell can reduce the startup time, is simple in structure, and is therefore advantageous when it comes to reducing the size, weight, and cost of the fuel cell. Further, as the flame is directly used, this type of fuel cell can be incorporated in a conventional combustion apparatus or an incinerator or the like, and is thus expected to be used as an electricity supply apparatus.

However, in this type of fuel cell, as the anode layer is formed on the outer circumference of a tubular solid electrolyte layer, radical components due to the flame are not supplied, in particular, to the upper half of the anode layer, and effective use cannot be made of the entire surface of the anode layer formed on the outer circumference of the tubular solid electrolyte layer. This has degraded the power generation efficiency. There has also been the problem that, as the solid electrolyte fuel cell is directly heated by the flame, cracking tends to occur due to rapid changes in temperature, and the solid electrolyte fuel cell, if cracked, eventually disintegrates into pieces, resulting in an inability to generate electricity.

In a solid electrolyte fuel-cell device, if the electromotive force is to be increased, a plurality of fuel cells, each constructed by forming a cathode layer and an anode layer on opposite surfaces of a solid electrolyte layer, have had to be fabricated and combined into a stack as shown in FIGS. 5A and 5B. Likewise, in the case of the fuel cell constructed by forming the cathode layer and the anode layer on the inner and outer circumferences of the tubular solid electrolyte layer shown in FIG. 6, as many fuel cells have to be combined as are needed to generate the required electromotive force. As a result, for applications where a high electromotive force is required but a small output current can serve the purpose, the apparatus size is too large, and reductions in size and cost cannot be achieved.

It is accordingly an object of the present invention to provide a solid electrolyte fuel-cell device wherein a plurality of fuel cells are formed on a single plate-like solid electrolyte substrate to construct a fuel-cell device that does not require a hermetically sealed structure, thereby achieving reductions in size and cost, while also achieving increased durability and increased power generation efficiency.

SUMMARY OF THE INVENTION

To solve the above-described problems, the solid electrolyte fuel-cell device of the present invention comprises: a solid electrolyte substrate; a plurality of cathode layers formed on one surface of the solid electrolyte substrate; and a plurality of anode layers formed on a surface of the solid electrolyte substrate opposite from the one surface, wherein a plurality of fuel cells are formed from the anode layers and the cathode layers formed opposite each other on the solid electrolyte substrate.

The anode layer of each of the fuel cells is electrically connected to the cathode layer of an adjacent one of the fuel cells to obtain a series output of the plurality of fuel cells, the electrical connection is made by a metal wire routed over an edge of the solid electrolyte substrate, or the electrical connection is made by a metal wire routed through a hole formed through the solid electrolyte substrate from one surface to the opposite surface thereof.

Alternatively, the electrical connection is made by a metal wire connected to an electrical conductor formed through the solid electrolyte substrate from one surface to the opposite surface thereof, or by a metal wire connected to a metal or an electrically conductive oxide that is filled into a hole opened through the solid electrolyte substrate and is sintered.

In the solid electrolyte fuel-cell device according to the present invention, the anode layers are exposed to a flame formed by combustion of a fuel and air is supplied to the cathode layers.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENT

An embodiment of a solid electrolyte fuel-cell device according to the present invention will be described below with reference to the drawings. However, before proceeding to the description of the solid electrolyte fuel-cell device of the present embodiment, prior art solid electrolyte fuel-cell devices, which provide the basis for the solid electrolyte fuel-cell device of the present embodiment, will be described in order to clarify the features and advantages of the present embodiment.

Figure 5A:
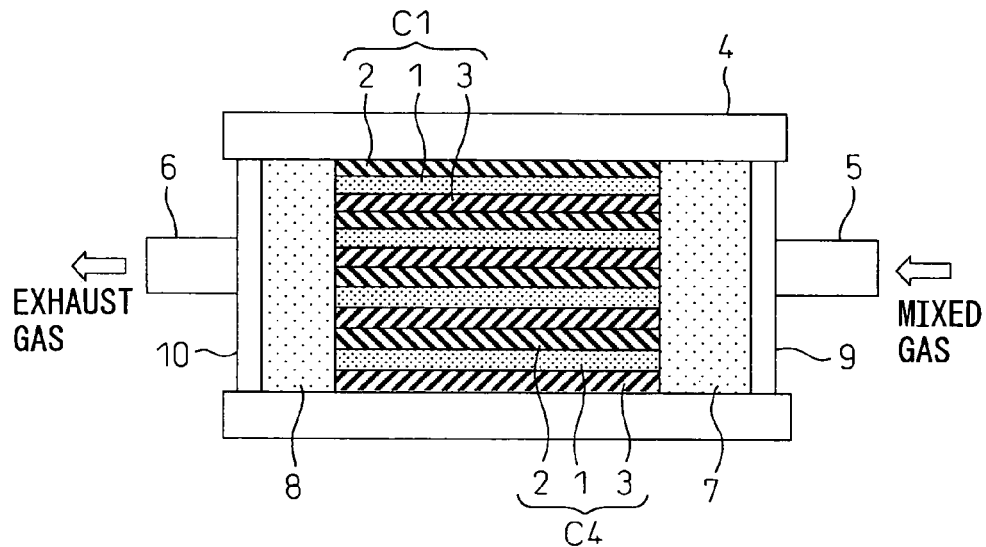
FIGS. 5A and 5B are diagrams schematically showing the structures of prior art solid electrolyte fuel-cell devices that use mixed fuel gas.
Figure 5B:
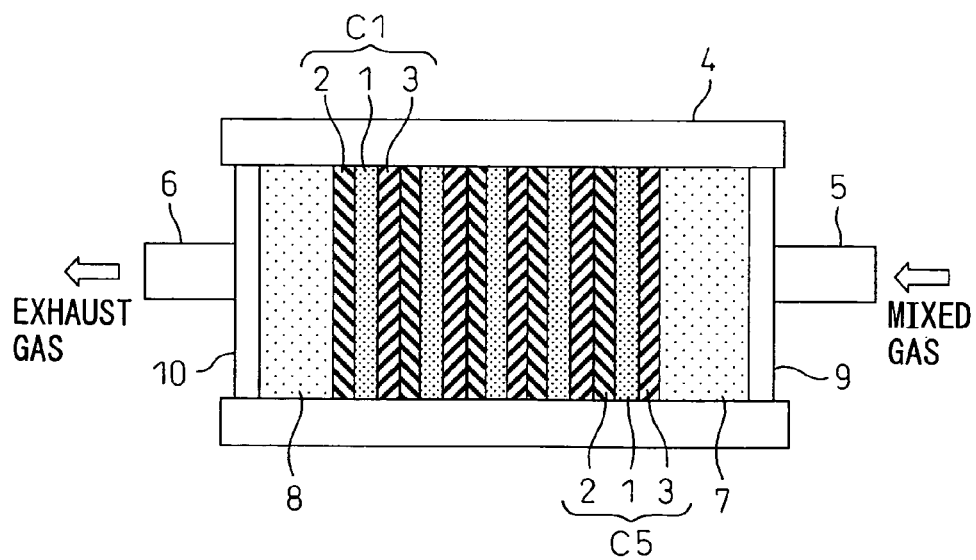

FIGS. 5A and 5B show the structures of the single-chamber fuel-cell devices proposed in the prior art. The fuel-cell device shown in FIG. 5A has a structure in which individual fuel cells each containing a solid electrolyte layer are stacked one on top of another with each cell oriented parallel to the flow direction of the mixed fuel gas. Each fuel cell comprises a solid electrolyte layer 1 of a closely compacted structure and a cathode layer 2 and an anode layer 3 as porous layers formed on opposite surfaces of the solid electrolyte layer 1, and the plurality of fuel cells C1 to C4 of identical structure are stacked in a ceramic container 4. Then, the fuel cells are hermetically sealed in the container 4, after adding fillers 7 and 8, by closing them with end plates 9 and 10.

The container 4 is provided with a supply pipe 5 for supplying the mixed fuel gas containing oxygen and a fuel such as methane and an exhaust pipe 6 for ejecting the exhaust gas. Vacant spaces in the container 4, where the mixed fuel gas and the exhaust gas flow, i.e., the areas in the container 4 other than the area occupied by the fuel cells, are filled with the fillers 7 and 8, and a suitable gap is provided therebetween, thereby preventing the mixed fuel gas from igniting even when the mixed fuel gas within the ignitability limit is contained therein when the fuel-cell device is operated.

The basic structure of the fuel-cell device shown in FIG. 5B is the same as that of the single-chamber fuel-cell device shown in FIG. 5A, except that the individual fuel cells each containing a solid electrolyte layer are stacked in the axial direction of the container 4 with each cell oriented perpendicularly to the flow direction of the mixed fuel gas. In this case, each fuel cell comprises a solid electrolyte layer 1 of a porous structure and a cathode layer 2 and an anode layer 3 as porous layers formed on opposite surfaces of the solid electrolyte layer 1, and the plurality of fuel cells C1 to C5 of identical structure are stacked in the container 4.

Figure 6:
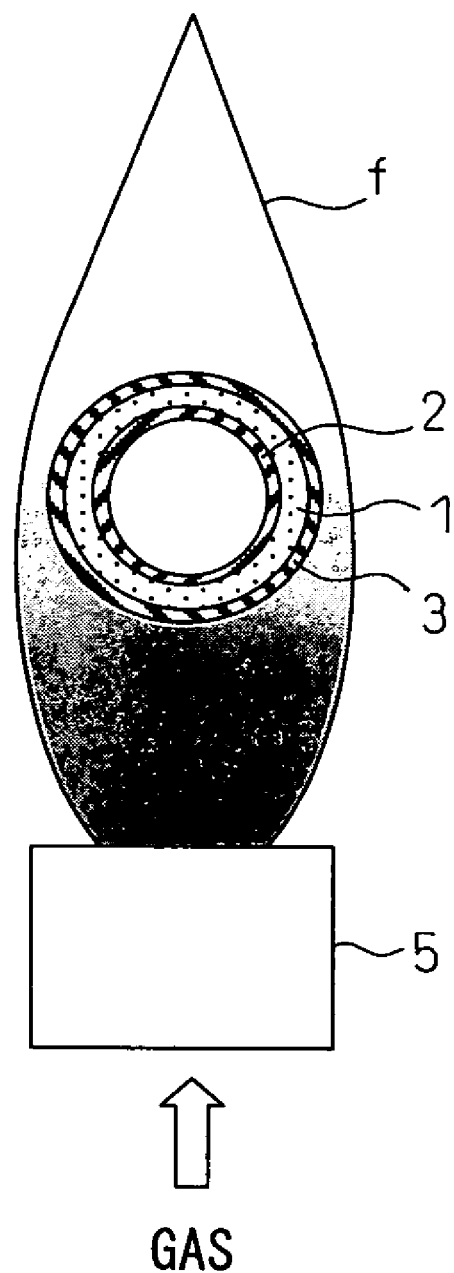
FIG. 6 is a diagram for explaining the structure of a prior art solid electrolyte fuel cell that uses a flame.

On the other hand, an electric power generating apparatus using a fuel cell that is not housed in a single chamber but directly utilizes a flame, as previously described, is shown in FIG. 6. The fuel cell used in the electric power generating apparatus shown in FIG. 6 comprises a zirconia solid electrolyte layer 1 formed in a tubular structure, an anode layer 3 as a fuel electrode formed on the outer circumference of the tubular structure, and a cathode layer as an air electrode formed on the inner circumference of the tubular structure.

This solid electrolyte fuel cell is operated with the anode layer 3 exposed to a reducing flame portion of a flame f generated from a combustion apparatus 5 to which the fuel gas is supplied. In this arrangement, radical components, etc. present in the reducing flame are utilized as the fuel, while air is supplied by convection or diffusion to the cathode layer 2 inside the tubular structure, and the fuel cell thus generates electricity.

Figure 1A:
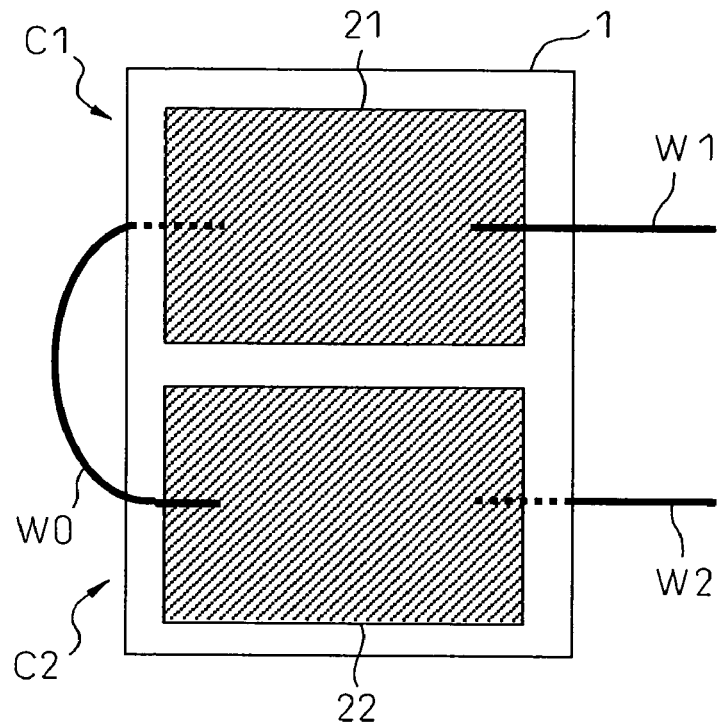
FIGS. 1A and 1B are diagrams for explaining an embodiment of a solid electrolyte fuel-cell device according to the present invention.
Figure 1B:
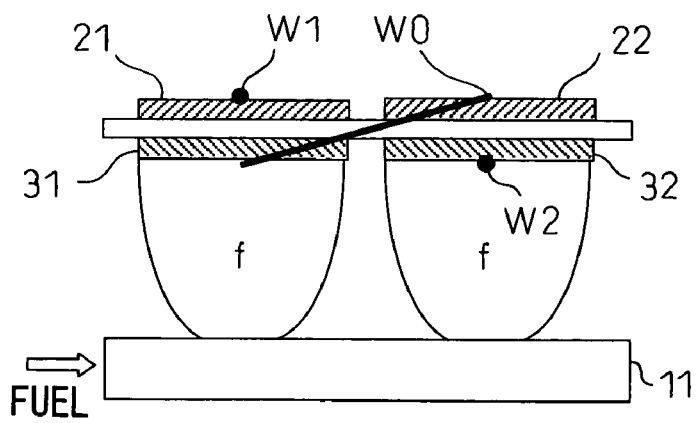

Next, the embodiment of the solid electrolyte fuel-cell device according to the present invention will be described with reference to the drawings. FIGS. 1A and 1B show the structure of the solid electrolyte fuel-cell device according to the present embodiment. FIG. 1A is a top plan view schematically showing the structure of the solid electrolyte fuel-cell device, and FIG. 1B is a side view of the same. The solid electrolyte fuel-cell device of the present embodiment shown in FIGS. 1A and 1B is a solid electrolyte fuel-cell device of the type that directly utilizes a flame such as shown in FIG. 6.

In the prior art solid electrolyte fuel-cell device that directly utilizes a flame, because the solid electrolyte layer is formed in the shape of a tube, the flame has not been applied efficiently to the anode layer formed on the outer circumference of the solid electrolyte layer; furthermore, one fuel cell has been constructed using one tubular solid electrolyte layer. In contrast, the solid electrolyte fuel-cell device of the present embodiment employs a solid electrolyte layer formed in the shape of a plate, for example, a thin plate-like solid electrolyte substrate; then, a plurality of cathode layers (air electrode layers) are formed on one surface of the solid electrolyte substrate, and a plurality of anode layers (fuel electrode layers) on the opposite surface thereof, and provisions are made so that a fluid fuel that forms flames by combustion, for example, methane or the like in the case of a gaseous fuel, or methanol or the like in the case of a liquid fuel, can be supplied so as to apply the flames over the surfaces of the plurality of anode layers.

As shown in FIGS. 1A and 1B, the solid electrolyte fuel-cell device of the present embodiment comprises a flat plate-like solid electrolyte substrate 1, a plurality of cathode layers, i.e., two cathode layers 21 and 22 in FIGS. 1A and 1B, formed on one surface of the solid electrolyte substrate 1, and two anode layers 31 and 32 formed on the opposite surface thereof, wherein the cathode layer 21 and the anode layer 31 together constitute a fuel cell C1 and the cathode layer 22 and the anode layer 32 together constitute a fuel cell C2. Here, an electromotive force extracting lead wire W1 is attached to the cathode layer 21, and likewise, an electromotive force extracting lead wire W2 is attached to the anode layer 32. The cathode layer 22 and the anode layer 31 are electrically connected by a connecting wire W0. The lead wires and the connecting wire are formed from a heat-resistant platinum material or a platinum-containing alloy.

A fuel supply pipe 11 is mounted which is located a prescribed distance below the solid electrolyte fuel cells C1 and C2, and the fuel such as a methane gas discharged from the plurality of holes provided in the fuel supply pipe 11 is burned to form flames f, which are fed to the surfaces of the anode layers 31 and 32. As the fuel cells C1 and C2 are connected in series, an output equal to the sum of the electromotive forces produced by the respective fuel cells C1 and C2 is obtained between the lead wires W1 and W2.

As the anode layers 31 and 32 of the fuel cells C1 and C2 of the present embodiment are formed in a flat plate-like shape, the flames can be applied uniformly compared with the tubular type. Further, the anode layers 31 and 32 are disposed facing the flame side so that hydrocarbons, hydrogen, radicals (OH, CH, $C_2$, $O_2H$, $CH_3$), etc. present in the flames can be easily used as the fuel.

Further, the flat plate-like structure has the effect of being able to completely shield the cathode layers 21 and 22 from the flames; as a result, with the anode layers 31 and 32 disposed facing the flame side, the cathode layers 21 and 22 can be exposed to the atmosphere. In the open-type fuel-cell device comprising the fuel cells C1 and C2, this makes it easier for the cathode layers 21 and 22 to use the oxygen in the atmosphere, and the oxygen-rich condition can thus be maintained. In this case, an oxygen-containing gas (air, oxygen-rich gas, etc.) may be fed to the cathode layers 21 and 22 in order to enhance the oxygen utilization efficiency of the cathode layers 21 and 22.

The fuel cells C1 and C2 are placed in or near the flame, more preferably in the reducing flame near the base of the flame. When the fuel cells are placed in the reducing flame, hydrocarbons, hydrogen, radicals, etc. present in the reducing flame can be efficiently used as the fuel; furthermore, the anode layers can be used in a good condition even when they easily tends to degrade due to oxidation, and the durability can thus be maintained.

Any fuel that burns and oxidizes by forming a flame (a flammable fuel) can be used as the fuel for combustion. Phosphorous, sulfur, fluorine, chlorine, or their compounds may be used, but an organic substance that does not need exhaust gas treatment is preferable. Such organic fuels include, for example, gases such as methane, ethane, propane, and butane, gasoline-based liquids such as hexane, heptane, octane, alcohols such as methanol, ethanol, and propanol, ketons such as acetone, and various other organic solvents, edible oil, kerosene, etc. Of these fuels, a gaseous fuel is particularly preferable.

Further, the flame may be a diffused flame or a premixed flame, but the premixed flame is preferred for use, because the diffused flame is unstable and tends to incur degradation of the performance of the anode layers due to the production of soot. The premixed flame is advantageous as the flame is not only stable but the flame size is easily adjustable; in addition, the production of soot can be prevented by adjusting the fuel density.

For the solid electrolyte substrate 1, known materials can be used, examples including the following:
  a) YSZ (yttria-stabilized zirconia), ScSZ (scandia-stabilized zirconia), and zirconia-based ceramics formed by doping these materials with Ce, Al, etc.
  b) SDC (samaria-doped ceria), GDC (gadolinium-doped ceria), and other ceria-based ceramics.
  c) LSGM (lanthanum gallate) and bismuth oxide-based ceramics.

For the anode layers 31 and 32, known materials can be used, examples including the following:
  d) Cermet of nickel and a ceramic based on yttria-stabilized zirconia or scandia-stabilized zirconia or a ceramic based on ceria (SDC, GDC, YDC, etc.).
  e) Sintered material composed principally of electrically conductive oxide (50% to 99% by weight) (electrically conductive oxide is, for example, nickel oxide with lithium dissolved in it).
  f) Material given in d) or e) to which a metal made of a platinum-group element or rhenium or its oxide is added in an amount of 1% to 10% by weight.

Of these materials, d) and e) are particularly preferable.

The sintered material composed principally of electrically conductive oxide given in e) has excellent oxidation resistance, and therefore, can prevent defects resulting from the oxidation of the anode layer, such as separation of the anode layer from the solid electrolyte layer and degradation of power generation efficiency or inability to generate power due to the rise in the electrode resistance of the anode layer. For the electrically conductive oxide, lithium-dissolved nickel oxide is preferable. It will also be noted that high power generation performance can be obtained by adding a metal made of a platinum-group element or rhenium or its oxide to the material given in d) or e).

For the cathode layers 21 and 22, known materials which contain an element, such as lanthanum, selected from group III of the periodic table and doped with strontium (Sr), can be used, examples include a manganic acid compound (for example, lanthanum strontium manganite) and a cobalt acid compound (for example, lanthanum strontium cobaltite and samarium strontium cobaltite).

In the present embodiment, not only the anode layers 31 and 32 and the cathode layers 21 and 22 but also the solid electrolyte substrate may also be formed in a porous structure. In the prior art, as the solid electrolyte layer was formed in a closely compacted structure, its thermal shock resistance was low, and the solid electrolyte layer easily tended to crack when subjected to rapid temperature changes. Generally, the solid electrolyte layer is formed thicker than the anode layer or the cathode layer; therefore, cracks in the solid electrolyte layer would lead to the formation of cracks in the entire structure of the solid electrolyte fuel cell which would eventually disintegrate into pieces.

When the solid electrolyte substrate is formed in a porous structure, its thermal shock resistance increases, and defects such as cracking do not occur even if the substrate is placed in or near a flame and subjected to rapid temperature changes or is subjected to a heat cycle involving rapid changes in temperature. Further, when the porous structure was fabricated with a porosity of less than 10%, no appreciable improvement in thermal shock resistance was observed, but when the porosity was 10% or higher, good shock resistance was observed, and a better result was obtained when the porosity was increased to 20% or higher. This is presumably because, when the solid electrolyte layer is formed in a porous structure, thermal expansion due to heating is absorbed by the pores in the porous structure.

The solid electrolyte fuel cells C1 and C2 are fabricated, for example, in the following manner. First, powders of materials for forming the solid electrolyte layer are mixed in prescribed proportions, and the mixture is molded into a flat plate shape. After that, the flat plate structure is calcined and sintered to produce the substrate which serves as the solid electrolyte layer. Here, by adjusting the kinds and proportions of the powder materials including a pore-forming agent and the calcination conditions such as calcination temperature, calcination time, preliminary calcination, etc., solid electrolyte layers with various porosities can be produced. A paste for forming the cathode layers 21 and 22 is applied over one surface of the substrate thus obtained as the solid electrolyte layer, and a paste for forming the anode layers 31 and 32 is applied over the other surface thereof; thereafter, the entire structure is calcined to complete the fabrication of the two solid electrolyte fuel cells C1 and C2 on one solid electrolyte substrate.

The durability of the solid electrolyte fuel cells can be further increased as will be described hereinafter. In this durability increasing method, a metal mesh is embedded in or fixed to each of the cathode layers 21 and 22 and the anode layer 31 and 32 in the flat plate-like fuel cells C1 and C2 shown in FIGS. 1A and 1B. In the case of the embedding method, the material (paste) for forming each layer is applied over the solid electrolyte layer, and the metal mesh is embedded in the thus applied material, which is then calcined. In the case of the fixing method, the metal mesh is not completely embedded in each layer material but may be fixed on a surface of it, followed by sintering.

For the metal mesh, a material that has excellent heat resistance, and that well matches the thermal expansion coefficient of the cathode layers and anode layers which the metal mesh is to be embedded in or fixed to, is preferred for use. Specific examples include a platinum metal and a platinum-containing metal alloy formed in the shape of a mesh. Alternatively, stainless steel of SUS 300 series (304, 316, etc.) or SUS 400 series (430, etc.) may be used; these materials are advantageous in terms of cost.

Instead of using the metal mesh, metal wires may be embedded in or fixed to the anode layers and the cathode layers. The metal wires are formed using the same metal material as that used for the metal mesh, and the number of wires and the configuration of the wire arrangement are not limited to any particular number or configuration.

The metal meshes or metal wires embedded in or fixed to the anode layers and the cathode layers serve to reinforce the structure so that the solid electrolyte layer cracked due to its thermal history, etc. will not disintegrate into pieces; furthermore, the metal meshes or the metal wires act to electrically connect the cracked portions.

The above description has been given by dealing with the case where the solid electrolyte substrate is formed in a porous structure, but it will be recognized that a closely compacted structure can be employed for the solid electrolyte substrate of the fuel cells of the present embodiment; in this case, the metal mesh or the metal wires embedded in or fixed to the cathode layers and the anode layers provide particularly effective means to cope with the problem of cracking due to thermal history.

The metal mesh or the metal wires may be provided in both the anode layers and the cathode layers or only in either the anode layers or the cathode layers. Further, the metal mesh and the metal wires may be used in combination. When the metal mesh or the metal wires are embedded at least in the anode layers, if cracking occurs due to thermal history, the power generation performance of the fuel cells does not degrade, and the fuel cells can continue to generate electricity. As the electricity power generation performance of the solid electrolyte fuel cells is largely dependent on the effective area of the anode layers as the fuel electrodes, the metal mesh or the metal wires should be provided at least in the anode layers.

In this way, a solid electrolyte fuel-cell device can be fabricated that comprises two solid electrolyte fuel cells formed on a single solid electrolyte substrate, as shown in FIGS. 1A and 1B, and that can receive flames on the anode layers formed on the same surface, while air is supplied to the cathode layer side separately from the flames. In the solid electrolyte fuel-cell device shown here, the connecting wire WO is routed outside the solid electrolyte substrate 1 to connect between the cathode layer 22 and the anode layer 31 in order to connect the two fuel cells in series.

Figure 2A:
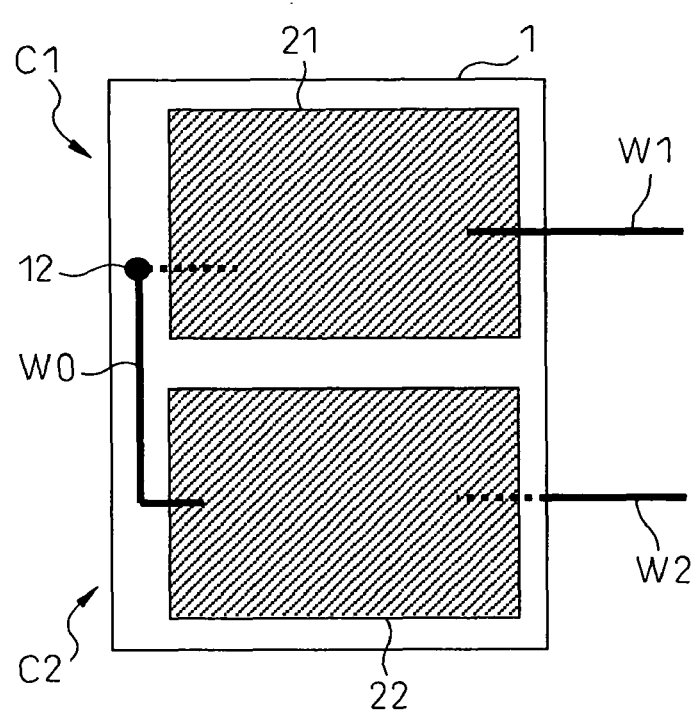
FIGS. 2A and 2B are diagrams for explaining another embodiment of a solid electrolyte fuel-cell device according to the present invention.
Figure 2B:
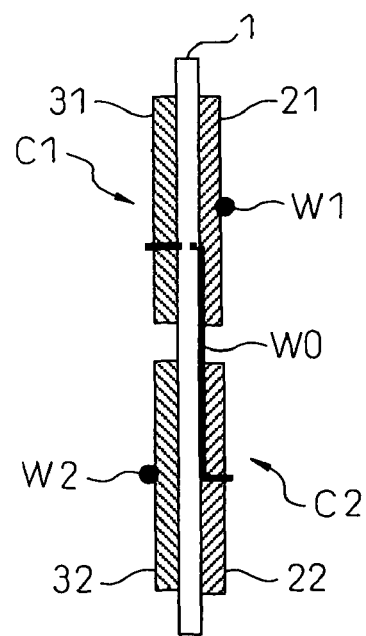

As the connecting wire WO protrudes outside the solid electrolyte substrate, the connecting wire WO may become an obstruction in certain applications. To avoid this, a via may be formed in a portion of the solid electrolyte substrate where neither the cathode layer nor the anode layer is formed, and the cathode layer and the anode layer may be connected together through this via. FIGS. 2A and 2B show how this connection is made.

FIG. 2A is a top plan view schematically showing the structure of the solid electrolyte fuel-cell device, and FIG. 2B is a side view of the same. The structure of the solid electrolyte fuel-cell device of the embodiment shown here is the same as that shown in FIGS. 1A and 1B, the only difference being the way in which the connecting wire WO is provided. This embodiment is the same as that shown in FIGS. 1A and 1B in that the connecting wire WO is provided to connect the anode layer 31 of the fuel cell C1 to the cathode layer 22 of the fuel cell C2, but differs in that the connecting wire WO is routed through the via 12, an electrical conductor, formed through an edge portion of the solid electrolyte substrate 1. This structure serves to reduce the size as the connecting wire WO can be routed to conform with the shape of the solid electrolyte substrate surface.

In the solid electrolyte fuel-cell device shown in FIGS. 2A and 2B, the via 12 is formed in an edge portion of the solid electrolyte substrate, but alternatively, the via may be formed through the solid electrolyte substrate in the position between the cathode layer and the anode layer of the two respective fuel cells. Further, rather than forming such a special via for electrical connection, a through-hole may be simply opened through the solid electrolyte substrate and the connecting wire may be passed through the through-hole. Alternatively, the cathode layer and the anode layer of the two respective fuel cells may be formed in a staggered fashion, and a via may be formed, for example, in a portion where the cathode layer 21 and the anode layer 32 overlap, to electrically interconnect the cathode layer 21 and the anode layer 32.

In the solid electrolyte fuel-cell devices shown in FIGS. 1A and 1B and FIGS. 2A and 2B, the electromotive force that one fuel-cell device can produce has been increased by forming two fuel cells on one solid electrolyte substrate. Next, examples for further increasing the electromotive force will be described with reference to FIGS. 3 and 4.

Figure 3:
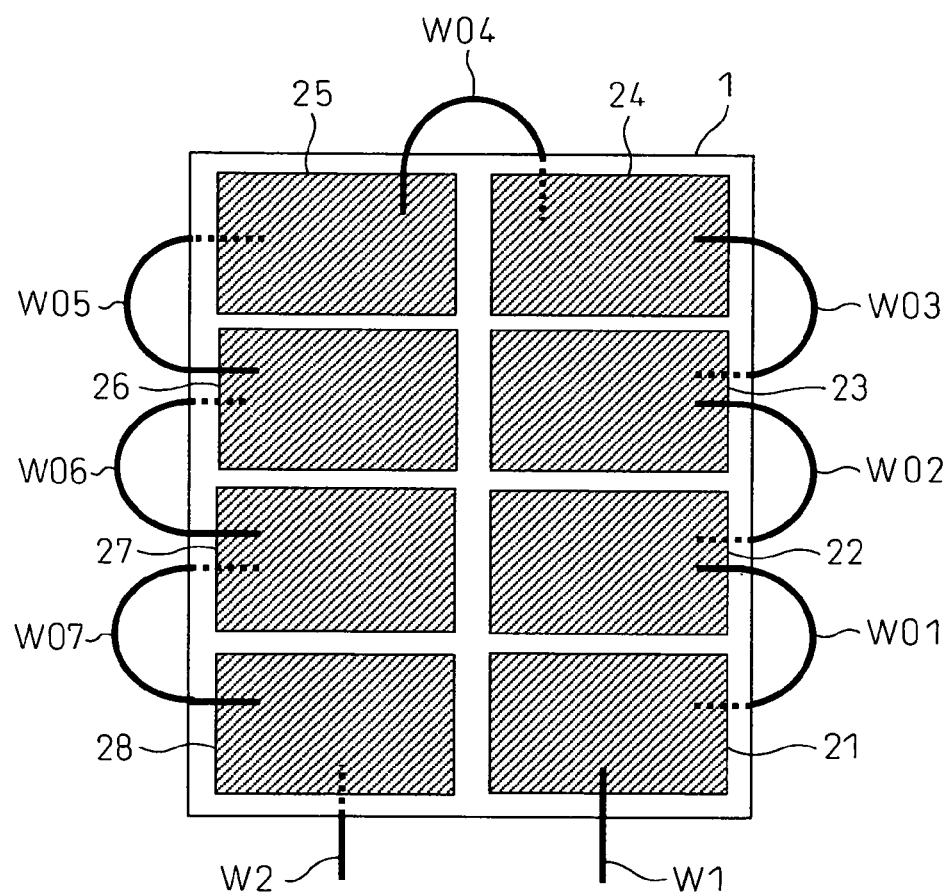
FIG. 3 is a diagram for explaining a specific example in the embodiment of the solid electrolyte fuel-cell device according to the present invention.

In FIG. 3 is shown a specific example in which eight fuel cells are formed on one flat plate-like solid electrolyte substrate 1, the overall shape of which is rectangular. Each individual fuel cell is formed on the solid electrolyte substrate 1 in the same manner as the solid electrolyte fuel-cell device shown in FIGS. 1A and 1B but, in this example, eight cathode layers 21 to 28 are formed on one surface of the solid electrolyte substrate 1 and, though not shown here, the corresponding eight anode layers are formed on the opposite surface thereof.

Between any two adjacent fuel cells, the anode layer of one fuel cell is connected to the cathode layer of the other fuel cell by a connecting wire designated W01, W02, . . . , or W07. In the illustrated example, the lead wire W1 is attached to the cathode layer 21, and the lead wire W2 is attached to the anode layer of the fuel cell formed at the edge. With these electrical connections, the eight fuel cells are connected in series, and the electromotive force increased to the desired level is produced between the lead wire W1 and the lead wire W2.

Figure 4:
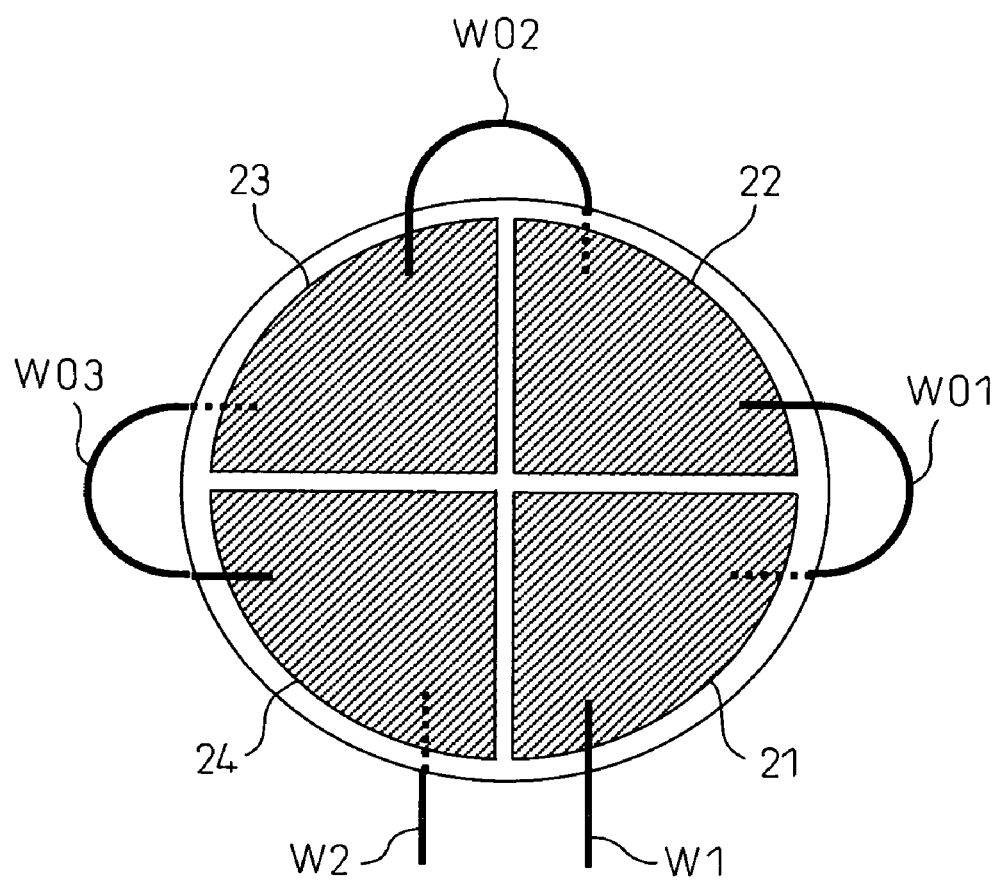
FIG. 4 is a diagram for explaining another specific example in the embodiment of the solid electrolyte fuel-cell device according to the present invention.

While FIG. 3 shows the case of the solid electrolyte substrate 1 formed in a rectangular flat plate shape, FIG. 4 shows the case where the solid electrolyte substrate 1 is formed in a circular flat plate shape. In the specific example of the solid electrolyte fuel-cell device shown in FIG. 4, four fuel cells are formed. The method of forming the individual fuel cells is the same as that shown in FIG. 3, the only difference being that the shape of the solid electrolyte substrate 1 is changed from rectangular to circular. Therefore, in the example of FIG. 4, the cathode layers and the anode layers are each formed in the shape of a quadrant.

The electromotive force of the fuel-cell device has been increased by forming eight fuel cells in the case of FIG. 3 and four fuel cells in the case of FIG. 4 on one flat plate-like solid electrolyte substrate; here, the number of fuel cells formed on the solid electrolyte substrate is determined according to the magnitude of the electromotive force required and, as the plurality of fuel cells are electrically connected in series, the area sizes of the respective layers should be made the same among these fuel cells.

In the solid electrolyte fuel-cell devices shown in FIGS. 3 and 4, electrical connections using vias, such as shown in FIGS. 2A and 2B, may also be employed for electrical connections between the plurality of fuel cells. Further, the plurality of fuel cells formed on one flat plate-like solid electrolyte substrate may be divided into a plurality of groups, and the electromotive force of the fuel-cell device may be generated by electrically connecting the fuel cells in parallel within each group while electrically connecting the respective groups in series.

In the present embodiment, the fuel-cell device has been described as using a flat plate-like solid electrolyte substrate, but the shape of the substrate need not necessarily be limited to the flat plate shape; for example, the substrate may be formed in a curved shape or a spherical shape, the only requirement being that the plurality of flames formed by the combustion of the fuel be applied uniformly over the entire surfaces of the plurality of anode layers formed on the substrate.

In the solid electrolyte fuel-cell device so far described, the fuel is supplied by applying the flames directly to the plurality of anode layers formed on one surface of a single solid electrolyte substrate; here, according to the structure of the solid electrolyte fuel-cell device of the present embodiment, as the principle of generating an electromotive force between the cathode layer and the anode layer is the same as that for the solid electrolyte fuel cells shown in FIGS. 5A and 5B, the electromotive force can be generated between the cathode layer and the anode layer by placing the plurality of fuel cells formed on the single solid electrolyte substrate in a mixed gas atmosphere consisting, for example, of a methane gas and an oxygen gas.

An example of the solid electrolyte fuel-cell device of the present embodiment so far described will be shown below.

EXAMPLE

A substrate of samaria-doped ceria (SDC, $Sm_{0.2}Ce_{0.8}O_{1.9}$ ceramic) with a thickness of 200 μm and a diameter of 15 mm was used as the solid electrolyte substrate. An SDC paste containing 50% by weight of $Sm_{0.5}Sr_{0.5}CoO_3$ was printed as a cathode layer on one surface of this ceramic substrate, and an SDC paste, to which Li-doped $NiO_2$ containing 5% by weight of $Rh_2O_3$ was added in an amount of 40% by weight, was printed as an anode layer on the opposite surface thereof; then, the entire structure was calcined at 1200° C. A pad with a diameter of 11 mm was divided into two or four sections by forming a 0.9 mm wide slit or slits therebetween so that the cathode layers and the another layers were formed in the respectively corresponding positions.

Next, a platinum mesh as an electrode member produced by welding platinum wires was embedded in each printed surface, and the resulting structure was calcined at 1200° C. for one hour in the atmosphere, forming each mesh as a current collecting electrode as well as a crack preventing member, to complete the fabrication of the solid electrolyte fuel cells. The thus fabricated fuel cells were electrically connected in series by platinum wires in such a manner that the anode layer of one cell was connected to the cathode layer of the next cell which was in turn connected to the anode layer of the next-following cell.

Using a gas burner, a premixed flame produced by burning butane gas at a flow rate of 400 ml/min was supplied to the anode layer of each of the thus fabricated solid electrolyte fuel cells.

When the power generation state at this time was examined, it was confirmed that, in the case of the solid electrolyte fuel-cell device consisting of two cells connected in series, the open-circuit voltage was 1.61 V and the output density was 165 mW/cm$^2$. In the case of the solid electrolyte fuel-cell device consisting of four cells connected in series, the open-circuit voltage was 3.53 V and the output density was 318 mW/cm$^2$.

Further, when a heat cycle test was conducted on the solid oxide fuel cells by cyclically turning on and off the premixed flame applied to the anode layers, no cracks occurred.

As described above, in the present invention, a plurality of fuel cells are constructed by forming a plurality of cathode layers and a plurality of anode layers on opposite surfaces of one plate-like solid electrolyte substrate, with provisions made to ensure that the flames formed by the combustion of the supplied fuel are uniformly applied over the entire surfaces of the plurality of anode layers; as a result, the fuel-cell device can be used as a simple power generating apparatus that can generate electricity efficiently and that does not require a hermetically sealed structure. Furthermore, by connecting the plurality of fuel cells in series, the electromotive force of the fuel-cell device can be increased using a simple configuration, and a fuel-cell device of a compact and thin construction can be achieved.

What is claimed is:

1. An open-type, planar solid electrolyte fuel-cell device having a plurality of cathode layers and anode layers, comprising:
    a single circular solid electrolyte substrate having surfaces opposed to each other;
    the plurality of cathode layers formed on one surface of said single circular solid electrolyte substrate being exposed to the atmosphere;
    the plurality of anode layers formed on another surface of said single circular solid electrolyte substrate opposite from said one surface, so as to oppose respective, said cathode layers across said single circular solid electrolyte substrate, being exposed to a flame in a localized heated open atmosphere; and
    each of the cathode layers and the anode layers having an area which is defined by dividing a circle of said single circular solid electrolyte substrate with a plurality of straight lines which runs through a center of the circle,
    wherein all of said cathode layers, said anode layers and said electrolyte substrate are porous, and
    wherein a porosity of said substrate is greater than 20%;
    metal wires are embedded in or fixed to a surface of at least one of said each cathode layer and said each anode layer,
    a plurality of open-type fuel-cell units are formed in pairs of respective said anode layers and said cathode layers, formed opposite each other across said single circular solid electrolyte substrate, and when said flame, formed by combustion of a fuel, is supplied to said anode layers and oxygen included in the atmosphere is supplied to said cathode layers, each of said plurality of open-type fuel-cell units generates electric power, and
    each of said anode layers is electrically connected with a metal wire routed over an edge of said single circular solid electrolyte substrate to said cathode layer next to the cathode layer facing said each anode layer, and said plurality of open-type fuel-cell units are connected in series.

2. An open-type, planar solid electrolyte fuel-cell device having a plurality of cathode layers and anode layers, comprising:
    a single circular solid electrolyte substrate having surfaces opposed to each other;
    the plurality of cathode layers formed on one surface of said single circular solid electrolyte substrate being exposed to the atmosphere;
    the plurality of anode layers formed on another surface of said single circular solid electrolyte substrate opposite from said one surface, so as to oppose respective, said cathode layers across said single circular solid electrolyte substrate being exposed to a flame in a localized heated open atmosphere; and
    each of the cathode layers and the anode layers having a quadrant shape area which is defined by dividing a circle of said single circular solid electrolyte substrate with a plurality of straight lines which runs through a center of the circle, wherein
    all of said cathode layers, said anode layers and said electrolyte substrate are porous, and
    wherein a porosity of said substrate is greater than 20%;
    metal wires are embedded in or fixed to a surface of at least one of said each cathode layer and said each anode layer,
    a plurality of open-type fuel-cell units are formed in pairs of respective said anode layers and said cathode layers, formed opposite each other across said single circular solid electrolyte substrate, and when said flame, formed by combustion of a fuel, is supplied to said anode layers and oxygen included in the atmosphere is supplied to said cathode layers, each of said plurality of open-type fuel-cell units generates electric power, and
    each of said anode layers is electrically connected to said cathode layer next to the cathode layer facing said each anode layer with a metal wire routed over an edge of said circular single solid electrolyte substrate from one surface to the opposite surface thereof, and said plurality of open-type fuel-cell units are connected in series.

* * * * *